Figure 1:
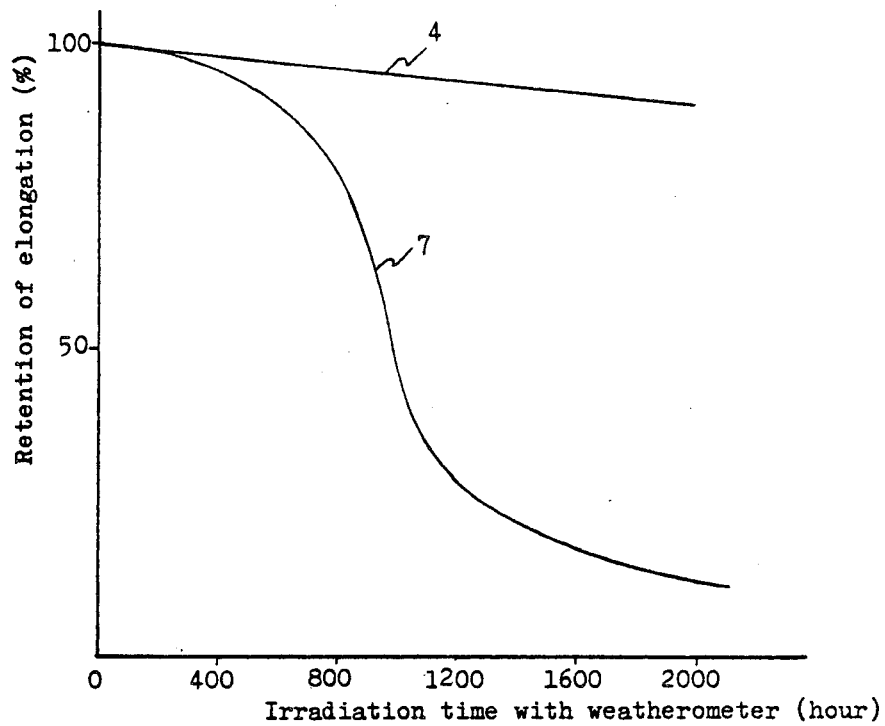

United States Patent [19]

Sakano et al.

[11] 4,373,063

[45] Feb. 8, 1983

[54] ELASTOMERIC COMPOSITION

[75] Inventors: Hajime Sakano, Hirakata; Fumio Nakai, Kurita; Yukio Tomari, Toyonaka, all of Japan

[73] Assignee: Sumitomo Naugatuck Co. Ltd., Osaka, Japan

[21] Appl. No.: 256,875

[22] Filed: Apr. 24, 1981

[30] Foreign Application Priority Data

Apr. 28, 1980 [JP] Japan ................................. 55-56452
Jun. 20, 1980 [JP] Japan ................................. 55-84137

[51] Int. Cl.³ ...................... C08L 51/06; C08L 53/00; C08L 75/04; C08L 67/00
[52] U.S. Cl. ...................................... 525/64; 525/66; 525/71; 525/80; 525/84
[58] Field of Search ..................... 525/66, 64, 71, 80, 525/84

[56] References Cited

U.S. PATENT DOCUMENTS

| | | | |
|---|---|---|---|
| 4,251,644 | 2/1981 | Joffrion | 525/64 |
| 4,284,541 | 8/1981 | Takeda | 525/80 |

FOREIGN PATENT DOCUMENTS

| | | | |
|---|---|---|---|
| 2721474 | 11/1978 | Fed. Rep. of Germany | 525/84 |
| 49-25189 | 6/1974 | Japan | 525/80 |
| 53-18652 | 2/1978 | Japan | 525/84 |
| 54-106554 | 8/1979 | Japan | 525/84 |
| 55-21430 | 2/1980 | Japan | 525/64 |
| 55-50058 | 4/1980 | Japan | 525/64 |

Primary Examiner—Paul Lieberman
Attorney, Agent, or Firm—Jones, Tullar & Cooper

[57] ABSTRACT

An elastomeric composition having excellent properties such as excellent heat aging characteristics, dimensional stability, processability, fabrication qualities, hydrolytic resistance, yellowing resistance, and weatherability, which comprises (A) a graft polymer of a rubbery copolymer consisting predominantly ethylene-propylene with at least two groups of the monomers selected from an aromatic vinyl compound, an ethylenically unsaturated nitrile and a methacrylic acid ester, and (B) a polymer selected from a thermoplastic polyurethane, an aromatic vinyl-conjugated diene block copolymer, a polyester elastomer and an olefinic elastomer, in the weight ratio of 10:90 to 90:10.

16 Claims, 5 Drawing Figures

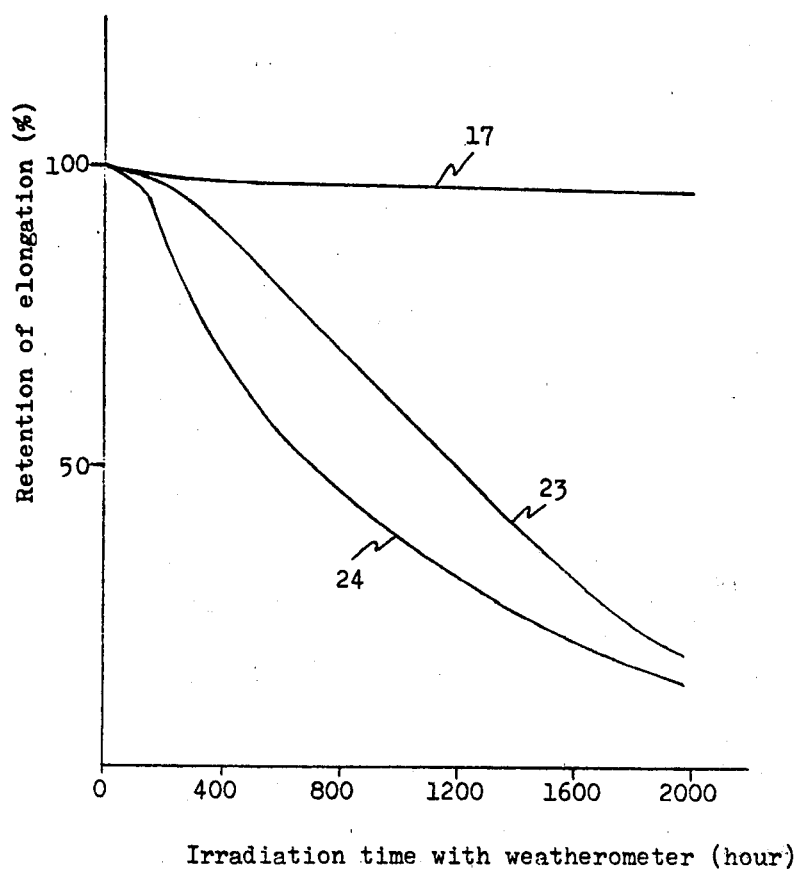

ELASTOMERIC COMPOSITION

The present invention relates to an elastomeric composition having excellent heat aging characteristics, dimensional stability, processability, fabrication qualities, hydrolytic resistance, yellowing resistance, and weatherability. More particularly, it relates to an elastomeric composition comprising (A) a graft polymer of a rubbery copolymer consisting predominantly of ethylene-propylene with at least two groups of the monomers selected from at least one aromatic vinyl compound, at least one ethylenically unsaturated nitrile and at least one methacrylic acid ester, and (B) a polymer selected from a thermoplastic polyurethane, an aromatic vinyl-conjugated diene block copolymer, a polyester elastomer and an olefinic elastomer.

It is well known that thermoplastic linear polyurethanes obtained by polyaddition reaction of various polyols, aromatic diisocyanates and chain extenders have excellent rubber elasticity, impact resistance and abrasion resistance and hence are widely used as various industrial parts and automobile parts. However, these thermoplastic polyurethanes have drawbacks in molding thereof, that is, the molten viscosity thereof highly depends on the temperature and hence they adhere onto the roll during calender processing and extrusion molding and they show a narrow range of temperature suitable for injection molding and further the viscosity thereof varies greatly during molding because of retention. Moreover, the thermoplastic polyurethanes are unfavorably inferior in the hydrolytic resistance and yellowing resistance.

It is also known that aromatic vinyl-conjugated diene block copolymers, particularly styrene-butadiene block copolymers (hereinafter, referred to as "SB block copolymer"), are elastomer having thermoplastic properties and rubber elasticity and are used as a heat-sensitive adhesive, an adhesive, and also as a modifier for hard resins such as ABS resin (acrylonitrile-butadiene-styrene resin) or high impact polystyrene (cf. Japanese Patent Publication No. 27289/1978, published on Aug. 8, 1978). However, the SB block copolymer is inferior in heat aging resistance and weatherability.

Moreover, it is known that polyester elastomers consisting of a polyester as a hard segment and a polyether as a soft segment have excellent heat resistance and rubber elasticity and are widely used as an engineering elastomer. However, since they have a crystalline hard segment, they have a large shrinkage in the molding thereof, which induces occasionally bad appearance such as sink marks on the molded product. Furthermore, they are inferior in fabrication qualities such as coating properties and adhesion.

In order to improve the drawbacks of these elastomers, it has been proposed to combine the elastomers with ABS resin or MBS resin (methyl methacrylate-butadiene-styrene resin), for example a composition of a termoplastic polyurethane, ABS resin and a diene polymer (cf. Japanese Patent Publication No. 7187/1978, published on Mar. 15, 1978), a composition of thermoplastic polyurethane and MBS resin (cf. Japanese Patent Publication No. 42385/1979, published on Dec. 13, 1979), and a composition of a polyester elastomer and ABS resin or MBS resin (cf. Japanese Patent Laid Open Application No. 252/1978, published on Jan. 5, 1978). However, these compositions are still inferior in hydrolytic resistance, yellowing resistance, and/or heat aging characteristics.

Under the circumstances, the present inventors have intensively studied to obtain an elastomeric composition having excellent heat aging characteristics, dimensional stability, processability, fabrication qualities, hydrolytic resistance, yellowing resistance and weatherability. As a result, it has been found that the desired elastomeric composition can be obtained by combining the elastomers as mentioned above with a graft polymer of a rubbery copolymer consisting predominantly of ethylene-propylene with at least two groups of the monomers selected from an aromatic vinyl compound, an ethylenically unsaturated nitrile and a methacrylic acid ester.

The elastomeric composition of the present invention comprises (A) a graft polymer of rubbery copolymer consisting predominantly of ethylene-propylene with at least two groups of the monomers selected from at least one aromatic vinyl compound, at least one an ethylenically unsaturated nitrile and at least one methacrylic acid ester, and (B) a polymer selected from a thermoplastic polyurethane, an aromatic vinyl-conjugated diene block copolymer, a polyester elastomer and an olefinic elastomer, said graft polymer (A) and polymer (B) being incorporated in the ratio (A:B) of 10:90 to 90:10 by weight.

The graft polymer (A) used in the present invention is prepared by graft-polymerizing a rubbery copolymer consisting predominantly of ethylene-propylene with at least two groups of the monomers selected from an aromatic vinyl compound, an ethylenically unsaturated nitrile and a methacrylic acid ester by conventional polymerization processes such as a bulk polymerization process, an emulsion polymerization process, a solution polymerization process, a bulk-suspension polymerization process, a suspension polymerization process, an emulsion-suspension polymerization process, etc. The amounts of the rubbery copolymer and the monomers to be graft-copolymerized are not critical, but the rubbery copolymer is preferably used in an amount of 5 to 60% by weight and the monomers are preferably used in an amount of 95 to 40% by weight, based on the total weight of the graft polymer (A).

The rubbery copolymer consisting predominantly of ethylene-propylene includes not only an ethylene-propylene rubber obtained from only ethylene and propylene monomers but also an ethylene-propylene-unconjugated diene terpolymer. Unconjugated diene includes dicyclopentadiene, ethylidenenorbornene, 1,4-hexadiene, 1,5-hexadiene, 1,4-cycloheptadiene, 1,5-cyclooctadiene, or a mixture thereof. The rubbery copolymer contains preferably ethylene and propylene in the molar ratio of 5:1 to 1:3. Besides, the ethylenepropylene terpolymer has preferably an iodine value (ratio of unsaturated groups) of 4 to 50.

The monomers to be graft-copolymerized with the rubbery copolymer are used in a combination of at least two groups, i.e. a combination of at least one aromatic vinyl compound and at least one ethylenically unsaturated nitrile, a combination of at least one aromatic vinyl compound and at least one methacrylic acid ester, a combination of at least one ethylenically unsaturated nitrile and at least one methacrylic acid ester, and a combination of at least one aromatic vinyl compound, at least one ethylenically unsaturated nitrile and at least one methacrylic acid ester.

The aromatic vinyl compound includes styrene, α-methylstyrene, α-chlorostyrene, dimethylstyrene, or the like, among which styrene is most preferable.

The ethylenically unsaturated nitrile includes acrylonitrile, methacrylonitrile, or the like, among which acrylonitrile is most preferable.

The methacrylic acid ester includes esters of methacrylic acid with an alkyl having 1 to 6 carbon atoms, such as methyl, ethyl, propyl, butyl, pentyl, hexyl, among which methyl methacrylate is most preferable.

The thermoplastic polyurethane, aromatic vinyl-conjugated diene block copolymer, polyester elastomer and olefinic elastomer used as the polymer (B) all have a flexural modulus of not more than 10,000 kg/cm$^2$.

The thermoplastic polyurethane is a linear addition polymer comprising a soft segment consisting of an ester of polyol and diisocyanate and a hard segment consisting of an ester of glycol and diisocyanate and is usually prepared by polymerizing equimolar amounts of a polyol, a glycol and a diisocyanate. The glycol includes ethylene glycol, 1,4-hexanediol, and the polyol includes polyester type polyols such as polyethylene adipate, and polyether type polyols such as polyoxytetramethylene glycol. The diisocyanate includes 4,4'-diphenylmethane diisocyanate and isophorone diisocyanate. The polyurethane includes all commercially available polyester type or polyether type thermoplastic linear polyurethanes, for example, Royler E-9 (polyether type, made by Uniroyal Inc.), Elastollan E-1095 (polyester type, made by Nippon Elastollan Industries Ltd.), Texin (polyester type, made by Mobay Chemical), Estane (polyester type, made by Goodrich), Iron Rubber (polyester type, made by Nippon Oil Seal), Paraprene (polyester type, made by Nippon Polyurethane), or the like.

The aromatic vinyl-conjugated diene block copolymer includes SB block copolymer, which is prepared by firstly polymerizing an aromatic vinyl compound in the presence of an anionic catalyst such as an organic lithium compound to prepare a living polymer "S block", adding thereto a conjugated diene compound and polymerizing them to prepare another living polymer "B block", and then coupling these living polymers with a polyfunctional coupling agent. The aromatic vinyl compound includes styrene, α-methylstyrene, dimethylstyrene, among which styrene is particularly preferable. The conjugated diene compound includes butadiene and isoprene. These aromatic vinyl compounds and conjugated diene compounds are each used alone or in combination of two or more kinds thereof. The coupling is done in various block forms, such as a radial block form: (S-B)$_n$, three block form: (S—B—S)$_n$, or the like. The SB block copolymer has preferably a conjugated diene content of 40 to 90% by weight, because it can give an elastomer composition having excellent rubber elasticity. Examples of commercially available SB black copolymer are Kaliflex TR (made by Shell Chemical), Toughprene A (made by Asahi Chemical).

The polyester elastomer is a block copolymer consisting of a crystalline hard segment having a high melting point and a soft segment having a low melting point, said hard segment consisting of an ester of a aromatic dicarboxylic acid (e.g. dimethyl terephthalate, dimethyl isophthalate), and said soft segment consisting of a polyether component (e.g. polyalkylene ether glycol), for example, a polyester-ether block copolymer which is prepared by subjecting dimethyl terephthalate, 1,4-butanediol and poly(tetramethylene oxide)glycol to polycondensation reaction or transesterification reaction in the presence of a catalyst at 200° to 250° C., followed by removing the presence of a catalyst at 200° to 250° C., followed by removing the produced water or methanol. Commercially available polyester elastomers are Hytrel 4056 (made by E. I. duPont), Pelprene P-4OH or Pelprene P-70B (made by Toyobo Co.).

The olefinic elastomer is a partially crosslinked mixture of an ethylene-propylene rubber and an α-olefinic polymer which is prepared by mixing and kneading mechanically an ethylene-propylene rubber and an α-olefinic polymer in the presence of a crosslinking agent whereby both components are partially crosslinked. The crosslinking agent includes all conventional peroxide crosslinking agents such as 2,5-bis(tert-butylperoxy)-2,5-dimethylhexane, diacetyl peroxide, dibenzoyl peroxide, dicumyl peroxide, tert-butyl perbenzoate and tert-butylcumyl peroxide. The ethylene-propylene rubber includes an ethylene-propylene copolymer and an ethylene-propylene-unconjugated diene terpolymer. The α-olefinic polymer includes polypropylene, an ethylene-propylene block copolymer, a low crystalline polypropylene containing atactic components, or the like. Commercially available olefinic elastomer is TPR-1000 (made by Uniroyal Inc.).

The graft polymer (A) and the polymer (B) are incorporated in the ratio (A:B) of 10:90 to 90:10, preferably 20:80 to 80:20, by weight. When the polyester elastomer is used as the component (B), the ratio of A:B should usually be in the range of 20:80 to 80:20 by weight. When the graft polymer (A) is incorporated in an amount of over the above upper limit, i.e. larger than 90% by weight [larger than 80% by weight in case of using a polyester elastomer as the polymer (B)], the resultant composition does not show rubber elasticity and loses the characteristics as an elastomer, and on the other hand, when the polymer (B) is used in an amount of over the upper limit, i.e. larger than 90% by weight (larger than 80% by weight in case of a polyester elastomer), the resultant composition is inferior in various properties, such as hydrolytic resistance, temperature dependence of melting viscosity, adhesion, dimensional stability (e.g. sink mark, shrinkage in molding), fabrication qualities, heat resistance, weatherability, or the like.

The graft polymer (A) and the polymer (B) are mixed in a usual manner with a Banbury mixer, an extruder, etc. The composition may be mixed with other various additives, such as stabilizers, plasticizers, electrostatic agents, lubricants, dyes and pigments, fillers, and further with other resins such as AS resin (acrylonitrile-styrene resin), MS resin (methyl methacrylate-styrene resin), ABS resin, or MBS resin unless they do give unfavorable effects on the properties of the composition.

The elastomeric composition of the present invention is a soft elastomer having an elongation of 200% or more and has excellent characteristics, such as excellent heat aging characteristics, dimensional stability, processability, fabrication qualities, hydrolytic resistance, yellowing resistance, and weatherability, and hence, is useful for the production of various industrial parts or automobile parts, or as an adhesive or an engineering elastomer.

The present invention is illustrated by the following Examples, but is not limited thereto.

EXAMPLE 1

Polyester elastomer:
Hytrel 4056, made by E. I. duPont
Pelprene P-4OH and Pelprene P-70B, made by Toyobo Co.
Graft polymer (A) (hereinafter, referred to as "AES resin"):
The AES resins are prepared as follows:

AES resin I

Ethylene-propylene-unconjugated diene terpolymer (300 parts by weight, iodine value: 8.5, Mooney viscosity: 61, propylene content: 43% by weight, unconjugated diene compound: ethylidenenorbornene) is dissolved in n-hexane (2,000 parts by weight) and ethylene dichloride (1,500 parts by weight), and thereto are added acrylonitrile (300 parts by weight), styrene (700 parts by weight) and benzoyl peroxide (10 parts by weight), and mixture is polymerized with agitating at 600 r.p.m. under nitrogen atmosphere at 67° C. for 10 hours. The polymerization mixture is contacted with a largely excess amount of methanol, and the resulting precipitates are separated and dried to give AES resin I (rubber content: 28.2% by weight).

AES resin II

In the same manner as described above except that styrene (400 parts by weight) and methyl methacrylate (300 parts by weight) are used instead of styrene (700 parts by weight), there is obtained AES resin II (rubber content: 28.2% by weight).

The AES resins obtained above are mixed with a polyester elastomer in an amount as shown in Table 1, and the mixture is mixed well and pelletized with an extruder (Single screw type, 40 φmm, made by Thermoplastic Co.), and the pellets thus obtained are molded with an injection molding machine (Inline screw type, 5 oz, made by Nissei Jushi Co.) to prepare test pieces.

Various properties of the test pieces prepared above were tested. The results are shown in Table 2.

TABLE 1

| | (% by weight) Run number | | | | | | |
|---|---|---|---|---|---|---|---|
| | Example | | | | | Reference | |
| Components | 1 | 2 | 3 | 4 | 5 | 6 | 7 |
| Hytrel 4056 | 40 | — | — | — | — | — | — |
| Pelprene P-40H | — | 30 | 70 | — | — | — | — |
| Pelprene P-70B | — | — | — | 50 | 50 | 90 | 50 |
| AES resin I | 60 | 70 | 30 | 50 | — | 10 | — |
| AES resin II | — | — | — | — | 50 | — | — |
| ABS resin*[1] | — | — | — | — | — | — | 50 |

*[1] ABS resin: Kralastic MH, made by Sumitomo Naugatack

TABLE 2

| Properties | Test method (unit) | Example | | | | | Reference | |
|---|---|---|---|---|---|---|---|---|
| | | 1 | 2 | 3 | 4 | 5 | 6 | 7 |
| Shrinking ratio | ASTM type 1 dumbbell (%) | 0.5 | 0.4 | 0.5 | 0.5 | 0.5 | 1.8 | 0.4 |
| Sink mark | (5" × ½" × ⅛") | Non | Non | Non | Non | Non | observed | Non |
| Surface hardness | ASTM-D2240 (D) | 52 | 65 | 43 | 55 | 50 | 40 | 60 |
| Tensile strength at break | ASTM-D638 (kg/cm$^2$) | 275 | 268 | 240 | 245 | 250 | 225 | 240 |
| Elongation | ASTM-D638 (%) | 400 | 280 | 450 | 350 | 410 | 460 | 300 |
| Compression set | JIS-K-6301 (70° C.) (%) | 58 | 65 | 50 | 57 | 56 | 50 | 58 |
| Coating properties (adhesion) | *2 | o | o | o | o | o | x | o |
| Weatherability (retention of elongation) | ASTM-D638 (%) (irradiated: 2000 hr, with weatherometer) | 88 | 93 | 92 | 90 | 90 | 90 | 13 |
| Heat aging resistance (retention of elongation) | ASTM-D638 (%) (heated: 110° C., 3000 hrs in oven) | 80 | 83 | 85 | 80 | 83 | 80 | 5 |

Figure 2:
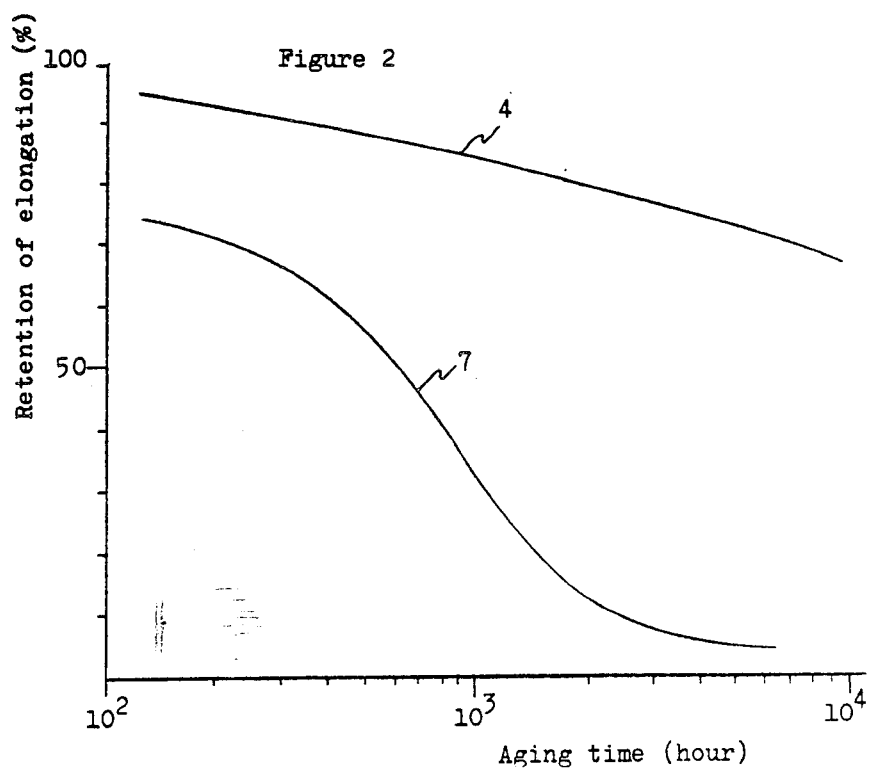

[Remark]:
*2It was coated with two-pack urethane composition, and the adhesion was observed. The results were evaluated as follows:
o: Excellent adhesion
x: Inferior adhesion Among the above test results, the relation between the irradiation time with weatherometer and the retention of elongation in run number 4 and 7 is shown in the accompanying FIG. 1, and the relation between the aging time at 110° C. in oven and the retention of elongation in run number 4 and 7 is shown in the accompanying FIG. 2.

EXAMPLE 2

SB block copolymer:
Kaliflex TR, made by Shell Chemical
Toughprene A, made by Asahi Chemical AES resins:

The same AES resin I and AES resin II as prepared in Example 1 are used. Moreover, another AES resin III is prepared as follows.

AES RESIN III

In the same manner as disclosed in Example 1 except that the amounts of the starting materials are changed, i.e. rubbery copolymer: 300→400 parts by weight, acrylonitrile: 300→200 parts by weight, and styrene: 700→600 parts by weight, respectively, there is obtained an AES resin (rubber content: 33.3% by weight). The resulting AES resin is mixed with styrene-acrylonitrile copolymer (styrene content: 70% by weight) prepared separately to give AES resin III (rubber content: 28.2% by weight).

The AES resins are mixed with an SB block copolymer in an amount as shown in Table 3, and the mixture is treated in the same manner as described in Example 1 to prepare test pieces. As a reference, a test piece is prepared likewise by using a commercially available ABS resin (Kralastic K-2540, made by Sumitomo Naugatack) instead of AES resin.

Various properties of the test pieces prepared above were tested. The results are shown in Table 4.

TABLE 3

| | (% by weight) Run number | | | | | | | |
|---|---|---|---|---|---|---|---|---|
| | Example | | | | | Reference | | |
| Components | 8 | 9 | 10 | 11 | 12 | 13 | 14 | 15 |
| Kaliflex TR | 60 | — | — | — | — | — | — | — |
| Toughprene A | — | 60 | 50 | 30 | 50 | 5 | 92 | 60 |
| AES resin I | 40 | 40 | — | 70 | — | 95 | — | — |
| AES resin II | — | — | — | — | 50 | — | 8 | — |
| AES resin III | — | — | 50 | — | — | — | — | — |
| ABS resin | — | — | — | — | — | — | — | 40 |

TABLE 4

| | Example | | | | | Reference | | |
|---|---|---|---|---|---|---|---|---|
| Properties | 8 | 9 | 10 | 11 | 12 | 13 | 14 | 15 |
| Heat resistance*[1] (Shrinkage (%) by heating 80° C. × 2 hr) | 0.8 | 0.7 | 0.3 | 0.2 | 0.3 | <0.1 | 8.5 | 0.7 |
| Weatherability*[2] | | | | | | | | |
| (1) Yellowing after irradiation with weatherometer, 1000 hr | o | o | o | o | o | o | x | x |
| (2) Cracking after irradiation with weatherometer, 1000 hr) | Non | Non | Non | Non | Non | Non | Observed | Observed |
| Surface hardness (Shore-D)*[3] | 30 | 34 | 38 | 43 | 40 | 85 | 27 | 30 |
| Tensile strength at break (kg/cm$^2$)*[4] | 80 | 105 | 120 | 210 | 150 | 305 | 75 | 75 |
| Elongation (%)*[5] | 380 | 285 | 280 | 270 | 270 | 25 | 410 | 360 |
| Compression set (%) (at 70° C.)*[6] | 38 | 41 | 43 | 45 | 45 | 85 | 65 | 36 |

[Remarks]:
*[1] It was measured with ASTM type 1 dumbbell.
*[2] It was measured with naked eyes and evaluated as follows:
o: No yellowing was observed.
x: Yellowing was observed.
*[3] It was measured by the method of ASTM-D2240.
*[4] It was measured by the method of ASTM-D638.
*[5] It was measured by the method of ASTM-D638.
*[6] It was measured by the method of JIS-K-6301.

Figure 3:
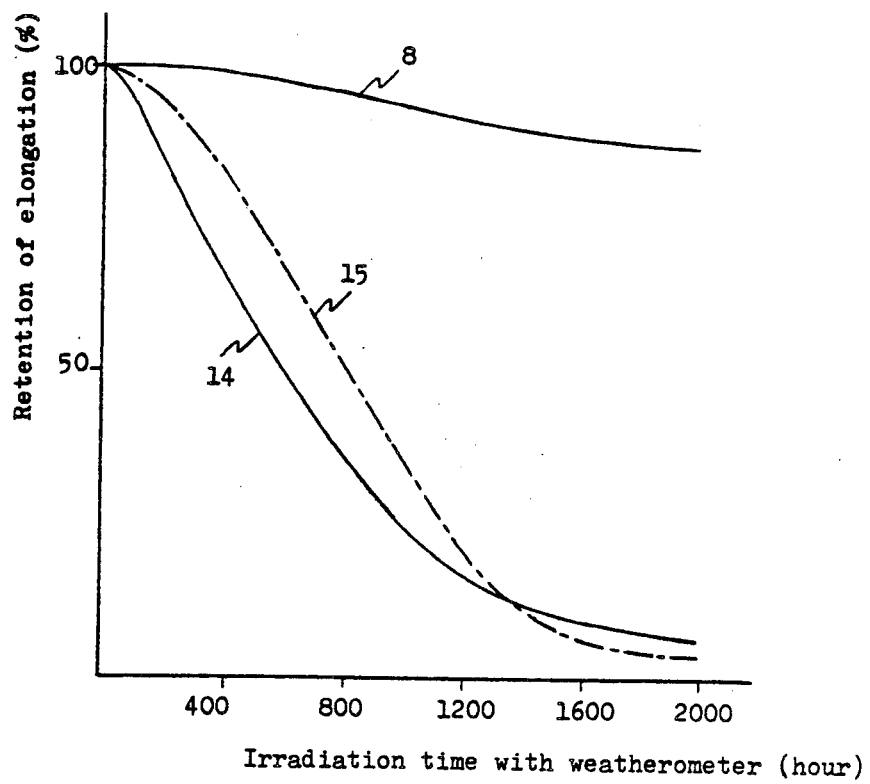

Among the above test results, the relation between the irradiation time with weatherometer and the retention of elongation in run number 8, 14 and 15 is shown in the accompanying FIG. 3.

EXAMPLE 3

Thermoplastic polyurethane:
Royler E-9 (polyether type, Shore hardness: 90A, made by Uniroyal Inc.)
Elastollan E-1095 (polyester type, Shore hardness: 95A, made by Nippon Elastollan Co.)

AES resins:
The same AES resin I and AES resin II as prepared in Example 1 are used.

The AES resins are mixed with a thermoplastic polyurethane in an amount as shown in Table 5, and the mixture is treated in the same manner as described in Example 1 to prepare test pieces. As a reference, test pieces are prepared likewise by using MBS resin (Kane-Ace B-26, made by Kanegafuchi Kagaku) and ABS resin (Kralastic K-2540, made by Sumitomo Naugatack) instead of AES resin.

Various properties of the test pieces prepared above were tested. The results are shown in Table 6.

TABLE 5

(% by weight) Run number

| | Example | | | | | Reference | | | |
|---|---|---|---|---|---|---|---|---|---|
| Components | 16 | 17 | 18 | 19 | 20 | 21 | 22 | 23 | 24 |
| Royler E-9 | 60 | — | — | — | — | 5 | 95 | — | — |
| Elastorane E-1095 | — | 60 | 30 | 50 | 50 | — | — | 60 | 60 |
| AES resin I | 40 | 40 | 70 | 50 | — | 95 | 5 | — | — |
| AES resin II | — | — | — | — | 50 | — | — | — | — |
| MBS resin | — | — | — | — | — | — | — | 40 | — |
| ABS resin | — | — | — | — | — | — | — | — | 40 |

TABLE 6

| | Example | | | | | Reference | | | |
|---|---|---|---|---|---|---|---|---|---|
| Properties | 16 | 17 | 18 | 19 | 20 | 21 | 22 | 23 | 24 |
| Hydrolytic resistance*[1] (Blushing) | Non | Non | Non | Non | Non | Non | Non | Remarkable blushing | Remarkable blushing |
| Processability | | | | | | | | | |
| (1) Fluidity (cc/min) (210° C., 30 kg/cm$^2$) | 0.15 | 0.10 | 0.10 | 0.15 | 0.15 | 0.05 | 0.20 | 0.10 | 0.05 |
| (2) Adhesion*[2] | o | o | o | o | o | o | x | o | o |
| Weatherability*[3] (yellowing after irradiation with weatherometer, 1000 hr) | o | o | o | o | o | o | Δ | x | xx |
| Surface hardness (Shore-D)*[4] | 55 | 58 | 65 | 60 | 58 | 88 | 48 | 57 | 58 |
| Tensile strength at break (kg/cm$^2$)*[5] | 280 | 275 | 230 | 250 | 270 | 335 | 295 | 285 | 275 |
| Elongation (%)*[6] | 430 | 400 | 280 | 350 | 400 | 20 | 490 | 420 | 380 |
| Compression set (%) (70° C.)*[7] | 38 | 40 | 50 | 50 | 50 | 90 | 35 | 40 | 43 |

TABLE 6-continued

| Properties | Example | | | | | Reference | | | |
|---|---|---|---|---|---|---|---|---|---|
| | 16 | 17 | 18 | 19 | 20 | 21 | 22 | 23 | 24 |
| Heat aging resistance*[8] | 75 | 76 | 77 | 75 | 77 | 78 | 25 | 13 | 12 |

[Remarks]:
*[1] The test pieces were immersed in hot water at 60° C. for 300 hours, and thereafter, the occurrence of blushing on the surface was observed.
*[2] Adhesion on the roll was observed and evaluated as follows:
o: No adhesion was observed.
x: Adhesion was observed.
*[3] The yellowing of the test pieces was evaluated as follows:
o: No yellowing was observed.
Δ: Yellowing was slightly observed.
x: Yellowing was observed.
xx: Remarkable yellowing was observed.
*[4] It was measured by the method of ASTM-D2240.
*[5] It was measured by the method of ASTM-D638.
*[6] It was measured by the method of ASTM-D638.
*[7] It was measured by the method of JIS-K-6301.
*[8] After the test pieces were aged by keeping in an oven at 80° C. for 3000 hours, and then the elongation of the resulting pieces was measured. The retention of elongation (%) was calculated in comparison with that before aging treatment.

Figure 4:
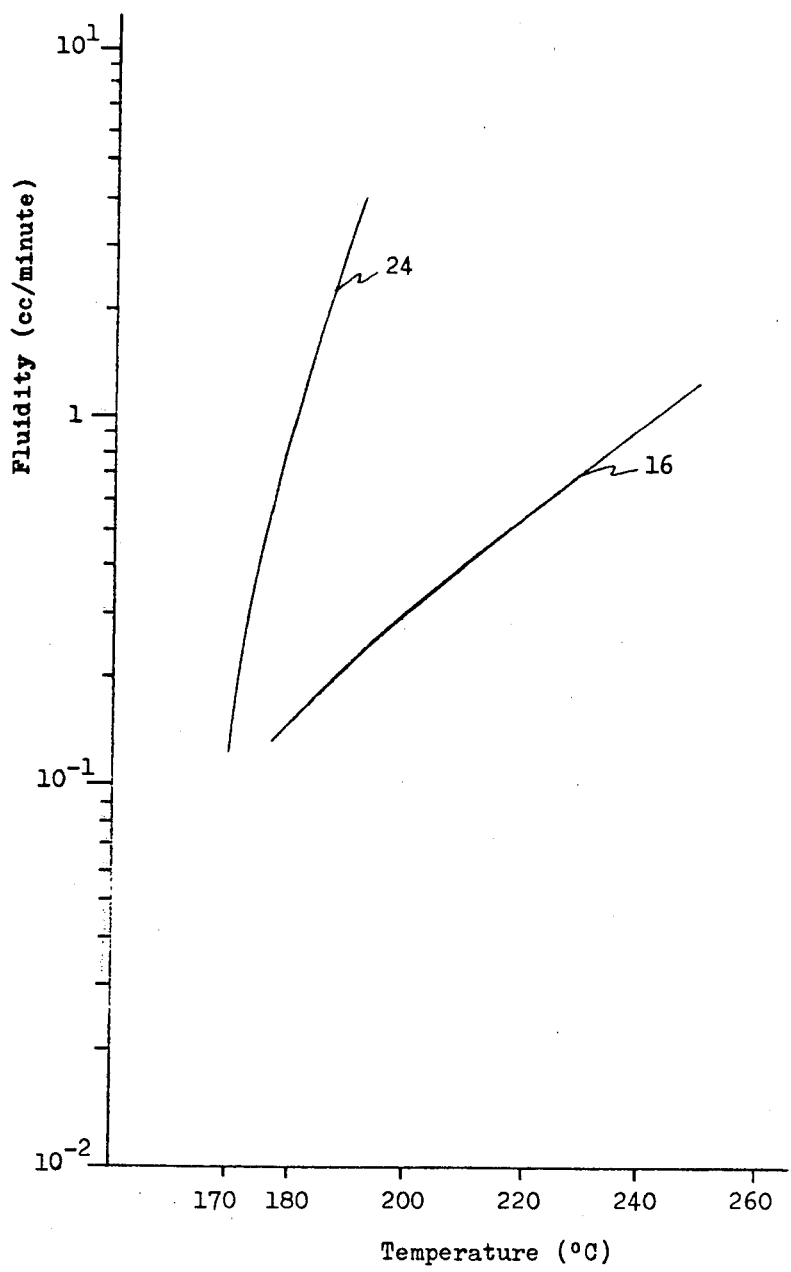

Besides, with respect to the run number 16 and 24, the fluidity was measured by passing through a nozzle (diameter: 1 mm, length: 10 mm) under a pressure of 70 kg/cm$^2$ at various temperature, and the variation of the fluidity at various temperature (temperature dependence) is shown in the accompanying FIG. 4. Moreover, the relation of the irradiation time with weatherometer and the retention of elongation in run number 17, 23 and 24 is shown in the accompanying FIG. 5.

EXAMPLE 4

Olefinic elastomer:
An olefinic elastomer is prepared as follows.

Ethylene-propylene-ethylidenenorbornene rubber (60 parts by weight) and polypropylene (40 parts by weight) are mechanically mixed with a kneader in the presence of 2,5-bis(tert-butylperoxy)-2,5-dimethylhexane (a crosslinking agent, 0.5 parts by weight) whereby they are partially crosslinked to give Olefinic Elastomer I having a flexural modulus of 3,700 kg/cm$^2$.

As a reference, a commercially available olefinic elastomer, TPR-1000 (made by Uniroyl) is used.

AES resins:
The same AES resin I and AES resin II as prepared in Example 1 are used.

The AES resins and the olefinic elastomers are mixed in an amount as shown in Table 7, and the mixture is treated in the same manner as described in Example 1 to prepare test pieces.

Various properties of the test pieces prepared above were tested. The results are shown in Table 8.

TABLE 7

| | (% by weight) Run number | | | | |
|---|---|---|---|---|---|
| | Example | | | Reference | |
| Components | 25 | 26 | 27 | 28 | 29 |
| Olefinic Elastomer I | 40 | 50 | — | 95 | — |
| TPR-1000 | — | — | 50 | — | 5 |
| AES resin I | 60 | — | 50 | 5 | 95 |
| AES resin II | — | 50 | — | — | — |

TABLE 8

| Properties* | Example | | | Reference | |
|---|---|---|---|---|---|
| | 25 | 26 | 27 | 28 | 29 |
| Shrinking ratio (%) | 0.7 | 0.6 | 0.5 | 2.5 | 0.45 |
| Shrinking hardness (Shore-D) | 53 | 60 | 65 | 52 | 97 |
| Tensile strength at break (kg/cm$^2$) | 195 | 190 | 180 | 165 | 395 |

TABLE 8-continued

| Properties* | Example | | | Reference | |
|---|---|---|---|---|---|
| | 25 | 26 | 27 | 28 | 29 |
| Elongation (%) | 480 | 460 | 450 | 630 | 35 |
| Compression set (%) (70° C.) | 53 | 55 | 58 | 50 | 90 |
| Coating properties (adhesion) | o | o | o | x | o |
| Weatherability (%) (retention of elongation after irradiation with weatherometer for 2000 hr) | 92 | 90 | 90 | 80 | 75 |
| Heat aging resistance (retention of elongation after heating at 110° C. for 3000 hrs in oven) | 84 | 85 | 85 | 85 | 80 |

*The properties were measured in the same manner as described in Table 2, 4, and 6.

What is claimed is:

1. An elastomeric composition comprising
   (A) a graft polymer of a rubbery copolymer consisting predominantly of ethylene-propylene with at least two groups of the monomers selected from at least one aromatic vinyl compound, at least one ethylenically unsaturated nitrile and at least one methacrylic acid ester, and
   (B) a polymer selected from a thermoplastic polyurethane, an aromatic vinyl-conjugated diene block copolymer, a polyester elastomer and an olefinic elastomer, which is a partially crosslinked mixture of an ethylene-propylene rubber and an α-olefinic polymer selected from the group consisting of a polypropylene and an ethylene-propylene block copolymer, said graft polymer (A) and polymer (B) being incorporated in the ratio of 10:90 to 90:10 by weight.

2. An elastomeric composition according to claim 1, wherein the graft polymer (A) consists of 5 to 60% by weight of the rubbery copolymer and 95 to 40% by weight of the monomers to be graft-copolymerized.

3. An elastomeric composition according to claim 1, wherein the rubbery copolymer is a member selected from the group consisting of an ethylene-propylene rubber and a terpolymer of ethylene, propylene and an unconjugated diene selected from dicyclopentadiene, ethylidenenorbornene, 1,4-hexadiene, 1,5-hexadiene, 1,4-cycloheptadiene, and 1,5-cyclooctadiene.

4. An elastomeric composition according to claim 1, wherein the aromatic vinyl compound is a member selected from the group consisting of styrene, α-methylstyrene, α-chlorostyrene and dimethylstyrene.

5. An elastomeric composition according to claim 1, wherein the ethylenically unsaturated nitrile is a member selected from the group consisting of acrylonitrile and methacrylonitrile.

6. An elastomeric composition according to claim 1, wherein the methacrylic acid ester is an ester of methacrylic acid with an alkyl having 1 to 6 carbon atoms.

7. An elastomeric composition according to claim 1, wherein the polymer (B) has a flexural modulus of not more than 10,000 kg/cm$^2$.

8. An elastomeric composition comprising
   (A) a graft polymer of a rubbery copolymer consisting predominantly of ethylene-propylene with at least two groups of the monomers selected from at least one aromatic vinyl compound, at least one ethylenically unsaturated nitrile and at least one methacrylic acid ester, and
   (B) a polyester elastomer, said graft polymer (A) and said polyester elastomer (B) being incorporated in a ratio of 10:90 to 90:10 by weight.

9. An elastomeric composition comprising
   (A) A graft polymer of a rubbery copolymer consisting predominantly of ethylene-propylene with at least two groups of the monomers selected from at least one aromatic vinyl compound, at least one ethylenically unsaturated nitrile and at least one methacrylic acid ester, and
   (B) a thermoplastic polyurethane, said graft polymer (A) and said thermoplastic polyurethane (B) being incorporated in a ratio of 10:90 to 90:10 by weight.

10. An elastomeric composition comprising
    (A) A graft polymer of a rubbery copolymer consisting predominantly of ethylene-propylene with at least two groups of the monomers selected from at least one aromatic vinyl compound, at least one ethylenically unsaturated nitrile and at least one methacrylic acid ester, and
    (B) an aromatic vinyl-conjugated diene block copolymer, said graft polymer (A) and said aromatic vinyl-conjugated diene block copolymer (B) being incorporated in a ratio of 10:90 to 90:10 by weight.

11. An elastomeric composition according to claim 8, wherein the graft polymer (A) consists of 5 to 60% by weight of the rubbery copolymer and 95 to 40% by weight of the monomers to be graft-copolymerized.

12. An elastomeric composition according to claims 8, 9, or 10, wherein the rubbery copolymer is a member selected from the group consisting of an ethylene-propylene rubber and a terpolymer of ethylene, propylene and an unconjugated diene selected from dicyclopentadiene, ethylidenenorbornene, 1,4-hexadiene, 1,5-hexadiene, 1,4-cycloheptadiene, and 1,5-cyclooctadiene.

13. An elastomeric composition according to claims 8, 9, or 10, wherein the aromatic vinyl compound is a member selected from the group consisting of styrene, α-methylstyrene, α-chlorostyrene and dimethylstyrene.

14. An elastomeric composition according to claims 8, 9, or 10, wherein the ethylenically unsaturated nitrile is a member selected from the group consisting of acrylonitrile and methacrylonitrile.

15. An elastomeric composition according to claims 8, 9, or 10, wherein the methacrylic acid ester is an ester of methacrylic acid with an alkyl having 1 to 6 carbon atoms.

16. An elastomeric composition according to claim 8, wherein the elastomer (B) has a flexural modulus of not more than 10,000 kg/cm$^2$.

* * * * *